United States Patent [19]

Herloski

[11] Patent Number: 4,508,421

[45] Date of Patent: Apr. 2, 1985

[54] HOLOGRAPHIC SCANNING SYSTEM UTILIZING A SCAN LINEARIZATION LENS

[75] Inventor: Robert P. Herloski, Rochester, N.Y.

[73] Assignee: Xerox Corporation, Stamford, Conn.

[21] Appl. No.: 517,610

[22] Filed: Jul. 27, 1983

[51] Int. Cl.³ ............................................. G02B 27/17
[52] U.S. Cl. .................................................. 350/3.71
[58] Field of Search ....................................... 350/3.71

[56] References Cited

U.S. PATENT DOCUMENTS

| | | | |
|---|---|---|---|
| 4,084,881 | 4/1978 | Hirabayashi et al. | 350/6.8 |
| 4,108,532 | 8/1978 | Minoura | 350/6.6 |
| 4,176,907 | 12/1979 | Matsumoto et al. | 350/6.9 |
| 4,179,183 | 12/1979 | Tateoka et al. | 350/6.1 |
| 4,209,223 | 6/1980 | Minoura | 350/6.1 |
| 4,470,659 | 9/1984 | Funato | 350/3.71 |
| 4,478,480 | 10/1984 | Doggett | 350/3.71 |

OTHER PUBLICATIONS

Ih et al., "Method for Eccentricity Compensation for Holographic Scanners", IBM Tech. Disc. Bulletin, vol. 25, No. 7B, Dec. 1982, pp. 3702-3703.
Xerox Disclosure Journal, "Disk Holographic Scanner with Scan Line Correction", by Charles J. Kramer, vol. 5, No. 3, May/Jun. 1980, pp. 265-266.

Primary Examiner—Bruce Y. Arnold

[57] ABSTRACT

An optical scanning system utilizing a spinner component having plane diffraction gratings thereon and a focusing lens adapted to compensate for linearization errors at the recording plane. The lens includes optical elements which compensate for the 3rd and 5th order coefficients of distortion associated with this type of diffraction scanning component.

1 Claim, 5 Drawing Figures

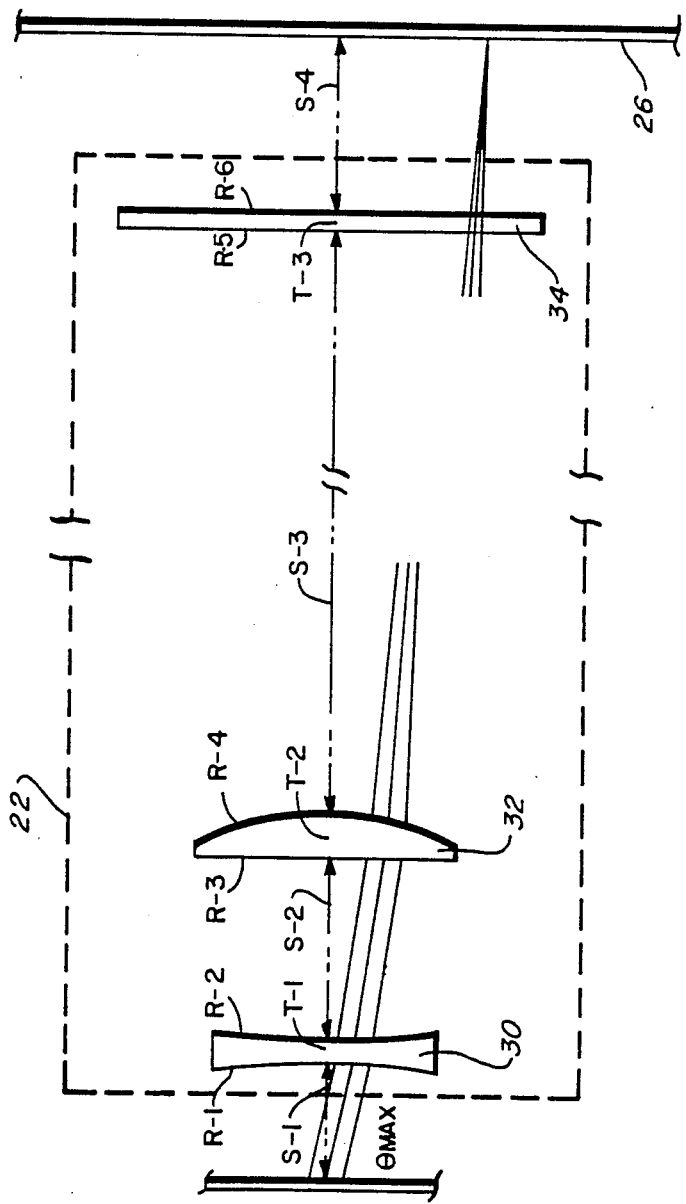

4,508,421

HOLOGRAPHIC SCANNING SYSTEM UTILIZING A SCAN LINEARIZATION LENS

BACKGROUND

This invention relates to a spot scanning system and more particularly to a scan linearization lens used in conjunction with a plane linear diffraction grating scanning device.

As disclosed in U.S. Pat. No. 4,289,371, whose contents are hereby incorporated by reference, an exemplary optical system is described which includes a scanning disc having a plurality of holographically formed plane linear diffraction gratings along its circumference. This scanning system, when operated within the disclosed ranges of reconstruction beam wavelength, grating period and incident and diffracted beam angles, results in a scanning system in which many of the errors which are inherent in this type of scanning system, e.g. scan line bow; error due to wobble of the rotating spinner and decentration are eliminated. Another phenomenon associated with this type of system is the tendency of the scanning spot velocity at the scanning plane to vary as a function of field position. Compensation can be implemented as broadly disclosed in the forementioned patent, by means of a lens to provide field flattening and scan linearization. According to the present invention, an exemplary embodiment of such a lens is disclosed. More particularly, the invention comprises an optical scanning system including a spinner having formed thereon at least one plane linear diffraction grating having a constant grating period d, a reconstruction light source of wavelength λ, which provides a beam of light directed at an angle of incidence $\theta_i$ in the cross-scan direction, to illuminate said grating, means for rotating said spinner so that said grating rotates through a rotation angle $\psi$ and diffracting a portion of the incident light at a cross-scan diffraction angle $\theta_d$, and a scan direction angle $\theta_s$ and an optical lens positioned so as to intercept and focus said diffracted beam onto an image plane from the optical axis to produce a scan line thereon, said optical lens having a third order coefficient of distortion $\sigma_5$ and a fifth order coefficient of distortion $\beta_9$ defined by the following equations:

$$\delta_5 = -f\left[\frac{3A^2 - 1}{6A^2}\right] \theta_{s\,max}^3 \text{ and}$$

$$\beta_9 = -f\left[\frac{15A^4 + 10A^2 - 9}{120A^4}\right] \theta_{s\,max}^5 \text{ where}$$

$f$ is the paraxial focal length of the lens and $$A = \frac{n(\text{diffraction order number})\lambda}{d}$$

FIG. 3 is a cross-sectional view of a lens designed to have distortion characteristics as represented by equations (9) and (10) appearing hereinafter.

DESCRIPTION

Figure 1:
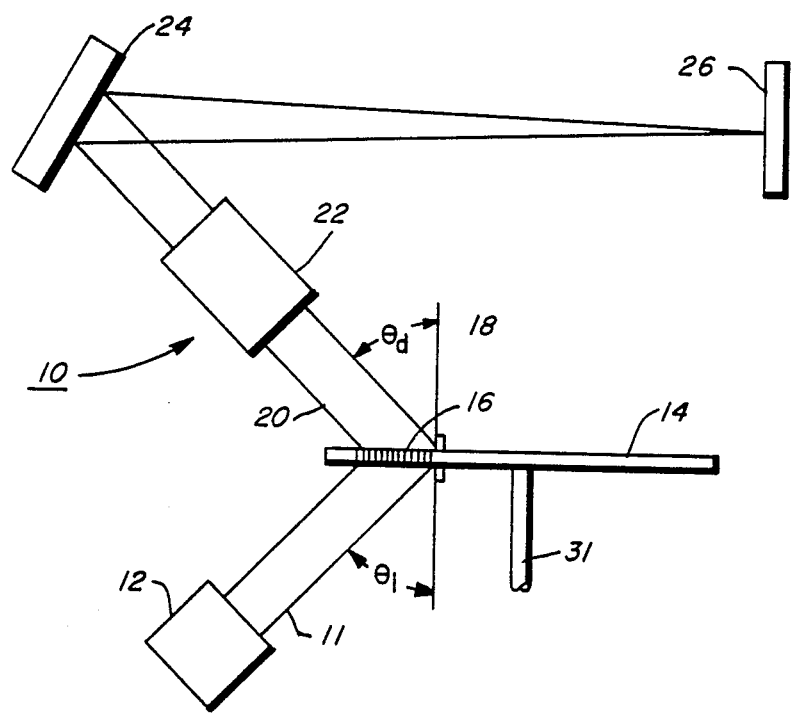
FIG. 1 is a schematic of a spot scanning system utilizing the lens of the present invention.

Referring now to FIG. 1, there is shown, schematically, an optical scanning system 10 utilizing the linearization lens of the present invention. Reconstruction light wavefront 11 emanates from a laser or other source of coherent light 12. Wavefront 11 is incident on hologon spinner 14 having a plurality of plane linear diffraction gratings 16 formed on its surface by the interference of an object and reference wavefront as described in said forementioned patent. Wavefront 11 is incident at an angle $\theta_i$ with respect to spinner axis 18. The output beam 20, also a plane wave, is diffracted at an angle $\theta_d$ with respect to the optical axis. Beam 20 is then focused by lens 22 and folded by mirror 24 onto image plane 26 which lies in the focal plane of the lens. As spinner 14 is rotated about shaft 31 by a motive means (not shown) which can be a conventional motor, facet 16 is rotated through wavefront 11 at some angle $\psi$ causing a scan direction rotation of the diffracted wavefront. The focal position of signal beam 20 will be displaced horizontally at plane 26 producing a single scan line. As additional gratings are rotated through wavefront 11, additional scan lines are generated. Lens 22 has been designed to provide field flattening and scan linearization of the output wavefront in a manner described in greater detail below.

Figure 2:
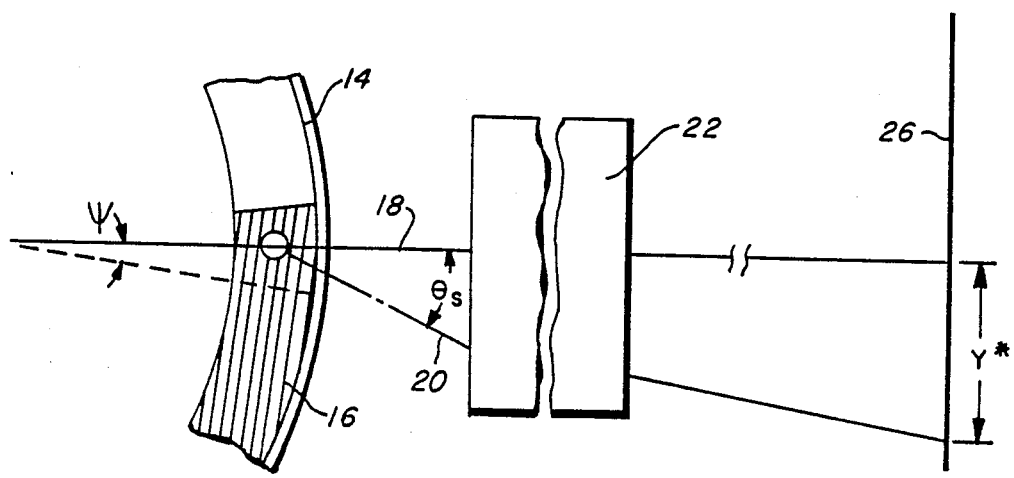
FIG. 2 is a partial representation of FIG. 1 showing a portion of the spinner grating, the lens of the present invention and incident and diffraction angles of the reconstruction wavefront at the grating.

FIG. 2 represents a schematic view of the unfolded optical system of FIG. 1 omitting mirror 24. As shown in FIG. 2, output beam 20 is focused by lens 22 onto image plane 26 at a distance Y* from the optical axis, Y* representing the real chief ray height. In order to produce a linear scan (such that $dY^*/dt =$ constant), and assuming that $d\psi/dt =$ constant, then:

$$\frac{dY^*}{d\psi} = \text{a constant is the desired system characteristic.} \quad (1)$$

Continuing, $$\theta_s = \arcsin[A \sin(\psi)], \quad (2)$$

where $A = n\lambda/d$,

Thus $$\psi = \arcsin\left[\frac{1}{A} \sin \theta_s\right].$$

If $dY^*/d\psi = kf$ is required where $f$ is the paraxial focal length of lens 22 and k is a constant, then n = diffraction order number
λ = wavelength of input beam 11
d = period of grating 16

$$Y^* = fA \arcsin\left[\frac{1}{A} \sin(\theta)_s\right]. \quad (3)$$

is the desired lens characteristic. The fifth order power series approximation to this function is $$Y^* \approx f\theta_s - f\left[\frac{A^2 - 1}{6A^2}\right] \theta_s^3 + f\left[\frac{A^4 - 10A^2 + 9}{120A^4}\right] \theta_s^5 \quad (4)$$

In terms of aberration theory, a lens with no distortion has a characteristic of:

$$Y = f \tan \theta_s, \quad (5)$$

or, as a fifth order approximation:

$$Y \approx f\theta_s + \frac{f}{3}\theta_s^3 + \frac{2f}{15}\theta_s^5. \quad (6)$$

The lens distortion $E_y'$, defined as $Y^* - Y$, has the form:

$$E_y' = \sigma_5 h^3 + \beta_9 h^5, \quad (h = Y/Y_{max}) \quad (7)$$

where $\sigma_5$ and $\beta_9$ are the 3rd and 5th order coefficients of distortion, respectively. Evaluating $Y^* - Y$:

$$E_y' = -f\left[\frac{3A^2 - 1}{6A^2}\right]\theta_s^3 - f\left[\frac{15A^4 + 10A^2 - 9}{120A^4}\right]\theta_s^5 \quad (8)$$

The 3rd and 5th order coefficients can be determined assuming $y = y_{max}$ ($h=1$) when $\theta_s = \theta_{s\,max}$, then equating equations 7 and 8 and comparing terms of equal order. Thus to produce a linear scan, lens 22 should have the following distortion characteristics:

$$\delta_5 = -f\left[\frac{3A^2 - 1}{6A^2}\right]\theta_{s\,max}^3 \text{ and} \quad (9)$$

$$\beta_9 = -f\left[\frac{15A^4 + 10A^2 - 9}{120A^4}\right]\theta_{s\,max}^5 \quad (10)$$

EXAMPLE

Figure 5:
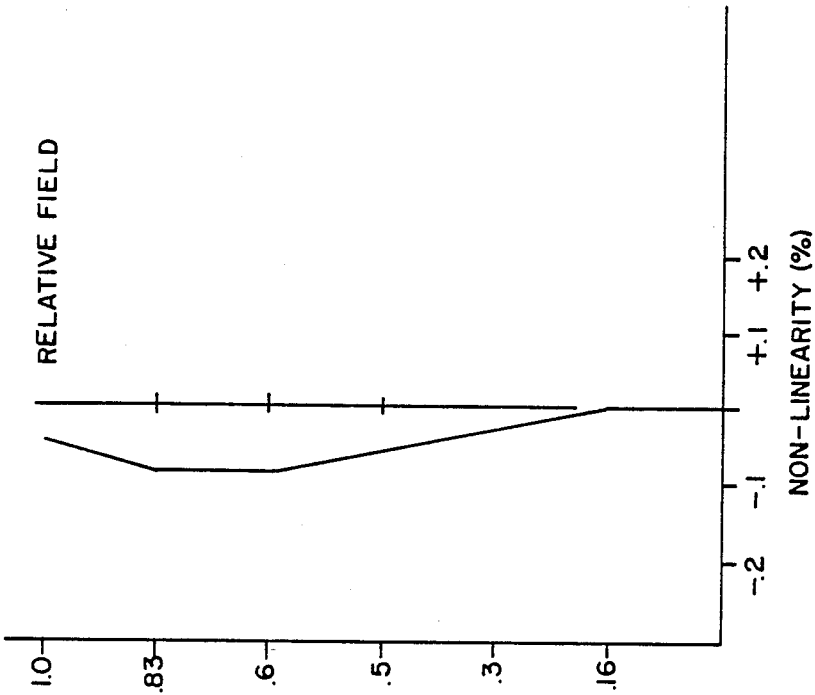
FIGS. 4 and 5 are aberration diagrams associated with the lens of FIG. 3.
Figure 4:
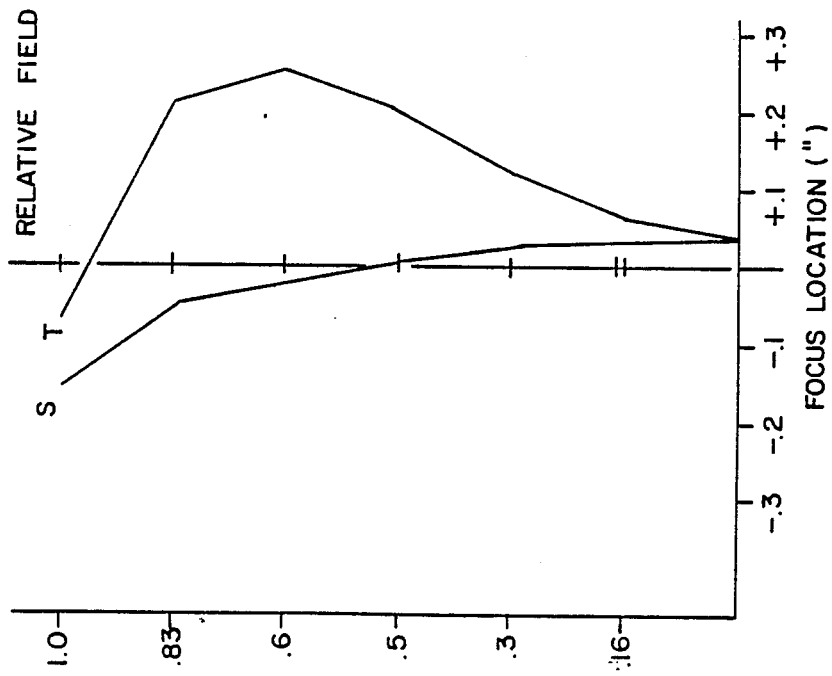

FIG. 3 and the associated Table, presented below provide an example of a three element lens which provides the desired compensation represented by Equations (9) and (10). Referring to FIG. 3, lens 22 includes a negative element 30, a positive element 32 and an optical window 34. Individual lens radii and thickness, and spacing between grating, lens elements and image plane are provided in the Table. The lens has a f/# of 180.00. Assuming a focal length of 52.2037", a $\theta_{s\,max}$ of 20.8109° and a reconstruction wavelength $\lambda$ of 632.8 nm, equations (9) and (10) are are solved yielding a 3rd order coefficient $\sigma_5$ of $-1.0423"$ and a 5th order coefficient $\beta_9$ of $-0.04882"$ or a total of $-1.09112"$. This sum compares favorably with a computer derived ray trace which indicated a paraxial image height (Y) of 19.8325" and an actual image height (Y*) of 18.7499" or a difference of $-1.0826"$ giving a negative distortion value of 5.5%. FIGS. 4 and 5 are the aberration diagrams for this lens configuration, FIG. 4 representing astigmatism and FIG. 5 linearity.

TABLE

| Lens Element | Radius(R) (inches) | Thickness(T) (inches) | Spacing(S) (inches) | Refractive (Index $N_d$) |
|---|---|---|---|---|
| 30 | $R_1 = -20.782035$<br>$R_2 = 65.79259$ | $T_1 = .4$ | $S_1 = 1.5$<br>$S_2 = 6.254316$ | 1.723086 |
| 32 | $R_3 = 289.10591$<br>$R_4 = -16.208052$ | $T_2 = .539664$ | $S_3 = 58.300935$ | 1.723086 |
| 34 | $R_5 = \infty$<br>$R_6 = \infty$ | $T_3 = .23$ | $S_4 = 8.027432$ | 1.515089 |
| Focal length = 52.2037 | | | | |

In conclusion, it may be seen that there has been disclosed an improved optical spot scanning system. The exemplary embodiments described herein are presently preferred, however, it is contemplated that further variations and modifications within the purview of those skilled in the art can be made herein. The following claims are intended to cover all such variations and modifications as fall within the spirit and scope of the invention.

What is claimed is:

1. An optical scanning system including a spinner having formed thereon at least one plane linear diffraction grating having a constant grating period d, a reconstruction light source of wavelength $\lambda$, which provides a beam of light directed at an angle of incidence $\theta_i$ to illuminate said grating, means for rotating said spinner so that said grating rotates through a rotation angle $\psi$ and diffracts a portion of the incident light at a cross-scan diffraction angle $\theta_d$, and a scan angle $\theta_s$ and an optical lens positioned so as to intercept and focus said diffracted beam onto an image plane from the optical axis to produce a scan line thereon, said optical lens having a third order coefficient of distortion $\sigma_5$ and a fifth order coefficient of distortion $\beta_9$ defined by the following equations:

$$\delta_5 = -f\left[\frac{3A^2 - 1}{6A^2}\right]\theta_{s\,max}^3 \text{ and}$$

$$\beta_9 = -f\left[\frac{15A^4 + 10A^2 - 9}{120A^4}\right]\theta_{s\,max}^5 \text{ where}$$

$f$ is the paraxial focal length of the lens and $$A = \frac{n(\text{diffraction order number})\lambda}{d}$$

* * * * *